Oct. 25, 1960

J. W. DICKEY 2,957,793

METHOD OF LAMINATING POLYURETHANE FOAM

Filed Sept. 28, 1956

INVENTOR
JOHN W. DICKEY
BY
William V. Ebs
HIS ATTORNEY

United States Patent Office 2,957,793
Patented Oct. 25, 1960

2,957,793

METHOD OF LAMINATING POLYURETHANE FOAM

John W. Dickey, Ridgewood, N.J., assignor to Curtiss-Wright Corporation, a corporation of Delaware Filed Sept. 28, 1956, Ser. No. 612,698

4 Claims. (Cl. 154—100)

My invention relates to a composite structure of adhered materials and the method of forming same.

The invention has particular application to the formation of a laminate structure having at least one layer of polyurethane foam of the polyester type, hereinafter sometimes called plastic foam or foamed plastic material. It is proposed to form such laminate structure without an adhesive the use of which may be undesirable for various reasons. Adhesive compounds such as those formulated from starch, dextrin, albumin, animal glue and other naturally occurring substances are for example subject to mold and/or insect attack. Adhesives also add to the cost of the end product, and such increased cost may be prohibitive where a large amount of adhesive is required as on a porous material such as a foamed plastic material. In addition, adhesives stiffen the materials on which they are used and therefore are not suitable for use in the formation of a resilient product. There is a further disadvantage in using an adhesive where a laminate structure for use in clothes or other articles requiring dry cleaning is desired, as for example, a laminated lining for a garment, since the adhesive may be caused to deteriorate upon coming in contact with dry cleaning fluid.

I propose to bind adjacent layers of material together into a laminate structure comprising a first layer of polyurethane foam plastic material of the polyester type, and a second layer which may also be of a plastic material or may be of some other material such as fabric, canvas, or paper, by applying the second layer to a fused surface of the said first layer of foamed plastic material. In accordance with the invention, the surface of the said first foamed plastic layer is rendered soft and tacky with the application of heat and the second layer of material is applied thereto while the surface of the plastic foam layer is soft and tacky. The second layer may be applied after the first plastic foam layer has been removed from the heat source and the surface temperature has cooled below the fusion temperature of the plastic foam material so that the surface portion of the plastic material is in a so-called supercooled state, that is, in a tacky liquid state at a temperature below the freezing or fusion temperature of the plastic foam material and the second layer of material may be applied without being scorched, or otherwise damaged, where this is of importance.

Polyurethane foamed plastic of the polyester type is particularly useful in providing a lamination for a carpet underlay or a garment lining. Such a lamination may comprise a layer of the foamed plastic material and a layer of fabric. In the carpet underlay the fabric prevents stretching of the foamed plastic material and renders the carpet slidable with the fabric in contact with the underside of the carpet. Without the fabric layer excessive friction between the foamed plastic material and carpet would prevent the carpet from being readily moved about. In the garment lining the fabric adds strength to the lamination and prevents stretching of the foamed plastic material as well as facilitating machine sewing operations.

A prime object of the invention is the provision of an improved structure of adhered materials at least one of which is polyurethane foam of the polyester type and the process for forming same according to which heat is applied to the said plastic material to fuse the surface thereof and other material for the structure is applied to the said fused surface causing the materials to adhere one to the other.

Another object of the invention is to provide a method of forming a laminate structure according to which a layer of material may be applied upon a fused surface of a foamed plastic layer of material without damage to the layer which is applied.

Still another object of the invention is the provision of a simple and efficient process subject to continuous operation for forming a laminate structure in the described manner.

A further object of the invention is the provision of an improved laminate construction for a carpet underlay comprising a first layer of foamed plastic material and a second layer of fabric which laminate construction is formed by adhering the fabric to a fused, tacky surface of the foamed plastic layer cooled below the fusion temperature of said foamed plastic material.

Other objects and advantages of the invention will become apparent during a reading of the specification.

Referring to the drawings.

Figure 1:
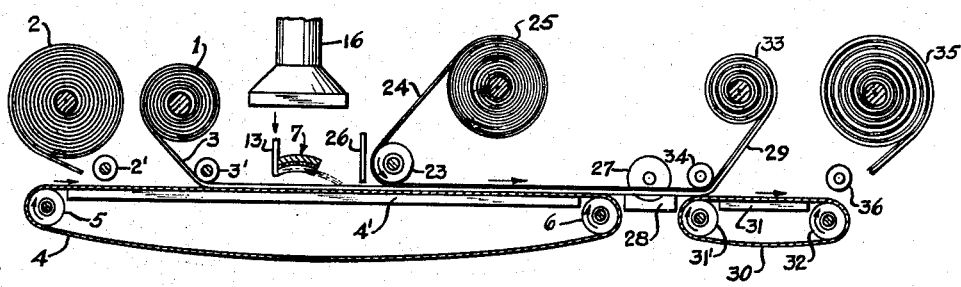
Fig. 1 is a diagrammatic illustration of apparatus for carrying out the process of the invention.

Reference is made of Fig. 1 illustrating the use of apparatus for carrying out the process of the invention to form a laminate structure comprising a layer of polyurethane foamed plastic material of the polyester type and a layer of fabric or comparable material. In Fig. 1 reference characters 1 and 2 designate supply rolls of sheet polyurethane foamed plastic material 3, such rolls being mounted for rotation above the wire mesh conveyor belt 4. Providing two rolls of material permits the process to be continued with a full roll after one roll has been emptied and while such empty roll is replaced with a new roll. Material from roller 1 is drawn under idler 3' and transported by conveyor belt 4 from left to right as viewed in the drawing. In the alternative the material from roller 2 is drawn under idlers 2' and 3' and transported by said conveyor belt. The material is maintained flat while transported on the belt by means of a supporting plate 4' under the belt. Movement is imparted to belt 4 by rollers 5 and 6 which connect with suitable driving means (not shown) for rotating the rollers at selected speeds in a clockwise direction as viewed in the drawing.

Figures 2, 3:
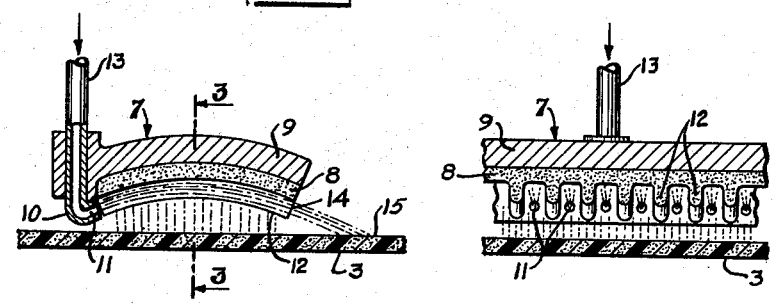
Fig. 2 is a cross-section view of a burner for heating the surface of a plastic layer used in forming a laminate construction according to the invention.
Fig. 3 is a sectional view on the plane of the line 3—3 of Fig. 2.

The material 3 is moved by conveyor belt 4 under a heater such as the radiant type refractory burner 7 shown in detail in Figs. 2 and 3. Burner 7 includes a refractory liner 8 on a metallic backing plate 9, and a ribbon burner element 10 having outlets 11 for directing jets of a combustible gas and air mixture between ridges 12 of the liner 8. Gas is burned between the ridges 12 and in the main the plastic material 3 beneath the burner is heated by radiation from the refractory material of the liner. The material 3 may, however, also be heated in some measure by direct flame impingement by maintaining the pressure of the combustible mixture in supply line 13 sufficiently high to cause gas flames to project beyond the burner's edge 14 and contact the material at 15.

As the foamed material 3 passes beneath the burner 7, the surface is caused to assume a soft and tacky condition. Only a superficial heating rendering the surface soft and tacky without altering the structure of the remainder of the material is desired. The requisite degree of heating may be obtained by properly regulating the speed with which the material 3 is moved under the burner. Further provision may be made for controlling the heat supplied to the moving sheet of material by having the heater adjustable in height above the material. As shown, a hood 16 is provided over the burner 7 for exhausting any gases resulting from the melting of the sheet material.

Figure 4:
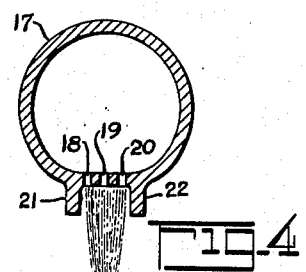
Fig. 4 is a cross-sectional view of another type of burner for heating the surface of a plastic layer to be used in forming the laminate structure of the invention.
Figure 5:
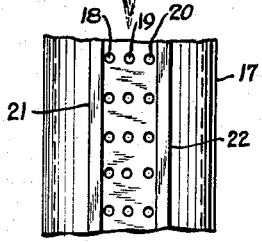
Fig. 5 is a bottom view of the burner of Fig. 4.
Figure 6:
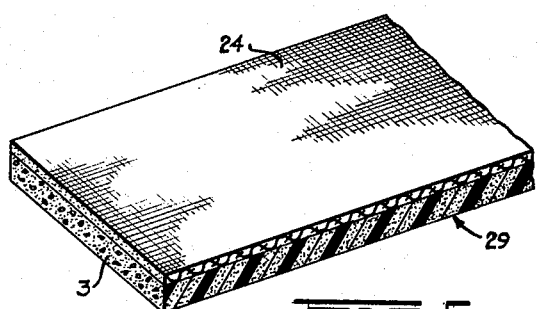
Fig. 6 is a perspective view partially in section showing a portion of the laminate structure formed in accordance with the invention.

In place of a radiant burner of the described type, other types of burners may be used for the purpose of heating the surface of sheet material 3. A burner of the type providing a vertical ribbon of flame extending across the sheet and directly impinging upon the material such as shown in Figs. 4 and 5 may, for example, be used for this purpose. Such burner comprises a conduit 17 having rows of openings such as the rows 18, 19 and 20 on the underside thereof extending over its length between flanges 21 and 22. In use the burner is disposed with the conduit 17 across the width of the moving plastic material. A combustible gas mixture is supplied under pressure within conduit 17, and is expelled from the openings in the underside of the conduit to provide a ribbon of flame for impingement upon the plastic material. Still another way of heating the plastic material is to dispose an electrically heated element such as a metal rod or blade in contact with the moving plastic material.

The foamed plastic sheet 3, after passing beneath the heater 7, is conveyed under a roller 23. Fabric sheet material 24 from a supply roller 25 rotatably mounted above the conveyor belt is also drawn under the roller 23 which presses the fabric against the surface of the foamed plastic material while the foamed plastic surface is still soft and tacky thereby causing the fabric to adhere to the foamed plastic material. Preferably the roller is vertically adjustable so that the pressure with which the fabric is pressed against the polyurethane foamed plastic sheet may be controlled. The roller 23 may be coated with an anti-adhesive such as polytetrafluoroethylene to prevent any plastic material which may contact the roller through the pores of the fabric from adhering to the roller surface. A suitable wax soap, or other mold-release agent may also be used on the roller 23 for this purpose.

As shown in the drawing the roller 23 is separated from the burner 7 by a shield 26 of insulating material. The purpose of the shield is to prevent scorching of the fabric by heat from the burner. In this connection it may be noted that it is a unique feature of the invention that the fabric 24 is not scorched when applied under roller 23 to the heated surface of the foamed plastic material 3. The fusion temperature of polyurethane foamed plastic material is about 450° F. so that it is necessary to heat the surface of the foamed plastic sheet material 3 to at least this temperature. Such fusion temperature is considerably above the temperature at which the fabric will scorch. The fused surface portion of the polyurethane foamed plastic material however has the characteristic of readily assuming a cooled state in which the temperature of the fused material is below the fusion temperature although the material is nevertheless soft and tacky. In accordance with the invention the fabric is applied to the material 3 when the surface of such material is in a said cooled state with the temperature below the scorching temperature of the fabric. The roller 23 is disposed with respect to the burner 7 to allow the surface of the material 3 to assume such cooled condition after moving from under the burner. Such a cooled state at the surface of the material is achieved in a very short period of time so that the roller 23 may be located in close proximity to the burner.

After the fabric 24 has been rolled onto the foamed plastic material 3 causing the fabric to adhere to the plastic material the resulting laminate structure is transported to a pair of motor driven cutters 27 extending through plate 28, which cutters trim opposite longitudinal edges of the laminate structure to prevent any overlapping of materials in the finished product. The trimmed laminate structure 29 passes onto a conveyor belt 30 which is supported by the plate 31 in a common plane with the supporting plate 4' of conveyor belt 4. Belt 30 is driven by the rollers 31' and 32 which connect with a common motive source for driving both of the belts 4 and 30. The trimmed laminate structure 29 constitutes the finished product and as such is wound onto a roll 33 above the belt 30 after passing under idler 34. Alternatively, the laminate product is wound onto a roll 35 disposed some distance from the roll 33 after passing under idlers 34 and 36. Providing for two rolls permits replacement of a full roll with an empty roll without interruption of the process.

It will now be apparent that I have provided a simple and efficient process for forming a laminate structure and that according to such process it is unnecessary to use adhesive to bind adjacent layers of the structure together. Adhering adjacent layers of the laminate structure together in accordance with the invention by rendering the surface of a plastic layer of material soft and tacky with the application of heat and applying another layer of material thereto when the fused plastic is in a cooled state below the freezing temperature of the plastic material is unique. As hereinbefore pointed out, permitting the surface material of the plastic layer to assume such a cooled state before applying the second layer prevents damage by heat to the second layer. A laminated structure formed according to the invention has numerous applications some of which have been mentioned. Additional applications which may be noted include the use of a laminated structure of foamed plastic material and fabric as a topper pad in upholstered chairs and the like, and the use of a laminated structure comprising a foamed plastic layer and an adjacent canvas layer in the manufacture of pieces of luggage.

It should of course be understood that this invention is not limited to the specific details of construction and arrangement thereof herein shown and described, and that changes and modifications may occur to one skilled in the art without departing from the spirit of the invention.

What I claim is:

1. A method of forming a laminate construction which method comprises heating a sheet of foamed polyurethane plastic material of the polyester type by contacting the same with a gas flame at the surface for a time sufficient to fuse a surface layer only and thereby to render substantially only such surface layer soft and tacky, and pressing a sheet of fabric material onto said soft and tacky layer after the latter has cooled to a temperature below the fusing temperature of the foamed polyurethane material.

2. A method of forming a laminate construction which method comprises contacting the surface of a sheet of polyurethane foamed plastic material of the polyester type with a gas flame to heat a surface layer thereof to a temperature of at least 450° F. and render substantially only such surface layer soft and tacky, and applying a sheet of porous material to said soft and tacky surface layer after the latter has cooled to a temperature below that which would damage said sheet of porous material.

3. A method of forming a laminate construction which method comprises impinging a gas flame directly upon the surface of a sheet of polyurethane foamed plastic material of the polyester type to heat a surface layer thereof to a temperature in excess of 450° F. to thereby fuse said surface layer and render substantially only such surface layer soft and tacky, and pressing a sheet of fabric material onto the soft tacky surface layer when said surface layer has cooled to a temperature not injurious to said fabric sheet.

4. A method of adhering two continuous webs, one of which is polyurethane foam of the polyester type, which method comprises conveying said foam web past, and in contact with, heating means for heating the surface portion of the foam web to a temperature in excess of the fusing temperature of said foam to fuse and render soft and tacky substantially only the surface portion of said foam web, and conveying the other web into contact with said soft tacky surface portion when said surface portion has cooled to a temperature below the freezing temperature of said polyurethane foam and is still in a tacky condition.

References Cited in the file of this patent

UNITED STATES PATENTS

| | | |
|---|---|---|
| 2,023,204 | Munters et al. | Dec. 3, 1935 |
| 2,366,514 | Gaylor | Jan. 2, 1945 |
| 2,488,446 | Swiss | Nov. 15, 1949 |
| 2,521,470 | Matheson | Sept. 5, 1950 |
| 2,632,921 | Kreidl | Mar. 31, 1953 |
| 2,658,288 | Scholl | Nov. 10, 1953 |
| 2,665,738 | Caskin | Jan. 12, 1954 |
| 2,841,205 | Bird | July 1, 1958 |
| 2,866,730 | Potchen et al. | Dec. 30, 1958 |

FOREIGN PATENTS

| | | |
|---|---|---|
| 842,267 | Germany | Sept. 15, 1952 |